US008517642B2

(12) United States Patent
Borunda

(10) Patent No.: US 8,517,642 B2
(45) Date of Patent: Aug. 27, 2013

(54) TOOL MOUNTED STUD FINDER

(76) Inventor: Phil Borunda, Pomona, CA (US)

( * ) Notice: Subject to any disclaimer, the term of this patent is extended or adjusted under 35 U.S.C. 154(b) by 1024 days.

(21) Appl. No.: 12/369,513

(22) Filed: Feb. 11, 2009

(65) Prior Publication Data

US 2010/0202846 A1 Aug. 12, 2010

(51) Int. Cl.
B23B 45/00 (2006.01)

(52) U.S. Cl.
USPC .............................................. 408/16; 324/67

(58) Field of Classification Search
USPC ............................. 408/16; 324/67
See application file for complete search history.

(56) References Cited

U.S. PATENT DOCUMENTS

| 4,295,279 | A | * | 10/1981 | Sienknecht | 33/334 |
| 5,797,670 | A | * | 8/1998 | Snoke et al. | 362/119 |
| 6,188,228 | B1 | | 2/2001 | Philipp | |
| 6,301,997 | B1 | | 10/2001 | Welte | |
| 6,851,487 | B1 | | 2/2005 | Shotey | |
| 6,926,473 | B2 | | 8/2005 | Luebke | |
| 7,066,278 | B2 | | 6/2006 | Shotey | |
| 7,150,587 | B2 | | 12/2006 | Dils | |
| 7,217,069 | B2 | | 5/2007 | Dils | |
| 8,174,274 | B2 | * | 5/2012 | Lawrence et al. | 324/686 |
| 8,272,813 | B1 | * | 9/2012 | Wise | 408/16 |
| 2003/0218469 | A1 | * | 11/2003 | Brazell et al. | 324/637 |
| 2005/0069391 | A1 | * | 3/2005 | Dils et al. | 408/16 |
| 2005/0111214 | A1 | * | 5/2005 | Zeiler | 362/119 |
| 2005/0247460 | A1 | | 11/2005 | Luebke | |
| 2008/0196910 | A1 | * | 8/2008 | Radle et al. | 173/2 |
| 2010/0155448 | A1 | * | 6/2010 | Murtha | 227/5 |
| 2010/0277332 | A1 | * | 11/2010 | Billings | 340/686.1 |
| 2011/0311328 | A1 | * | 12/2011 | Barr et al. | 408/2 |

FOREIGN PATENT DOCUMENTS

| EP | 1036635 A2 | * | 9/2000 |
| GB | 2333478 A | * | 7/1999 |
| WO | WO 9852723 A1 | * | 11/1998 |

OTHER PUBLICATIONS

Translation of EP 1036635. Jun. 2009. Tanslated by: The McElroy Translation Company.*

* cited by examiner

Primary Examiner — Daniel Howell
Assistant Examiner — Justin Sikorski
(74) Attorney, Agent, or Firm — Fish & Associates, PC

(57) ABSTRACT

A tool adapter is disclosed configured to locate a stud such as that in a wall of a structure. The adapter comprises a mounting portion configured to releasably attach externally to a tool, and a detector portion configured to detect the presence of a stud.

9 Claims, 3 Drawing Sheets

TOOL MOUNTED STUD FINDER

FIELD OF THE INVENTION

The field of the invention is tools.

BACKGROUND

During building construction, studs must generally be located before portions of the wall can be affixed to the studs. Once a stud is located, a screw, nail or other fastener is inserted through the portion of wall, typically a piece of drywall, and into the stud. If a fastener misses the stud, the fastener often will puncture the wall and create a hole. Repair of these undesirable holes can significantly add to the time, cost, and materials required for the wall installation.

Various solutions in the prior art are known to reduce the likelihood of missing the stud when inserting a fastener. Previously, studs were located by tracing or mapping their location on to the drywall as the drywall was installed. For example, mapping typically involved marking the drywall along a horizontal axis at set distances, marking the drywall along a second horizontal line, and using a straight-edge to trace a vertical line that connects each pair of marks and thereby illustrate the location of each stud. While this solution helped to locate the studs, the tracing could often be very time-consuming and lack the accuracy required for proper drywall installation.

To eliminate the need for tracing, it is known to use hand-held electronic stud locators. For example, U.S. Pat. No. 4,099,118 to Franklin, et al., discusses an electronic wall stud sensor that uses electronic sensing circuitry to accurately determine the location of the stud. One problem with this solution is that such handheld stud locators are typically separate devices from the tools, and thus generally involve additional steps. For example, the stud must first be located with the sensor, and then either the sensor must be put down or the stud is inserted with one hand. If the sensor must be put down before inserting the fastener, this will typically add to the time and cost of installation. If the fastener is instead inserted with one hand, this can increase the likelihood of improper insertion. Franklin and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

To eliminate the requirement of having two separate devices, stud locators have been built-in to a variety of tools. For example, U.S. Pat. No. 6,188,228 to Philipp discusses a hammer having a stud sensing means located within the handle. While effective to locate a stud, the built-in sensor fails to allow for the sensor to be used with a plurality of tools. A further problem is that for users to benefit from the sensor, users must generally replace their existing tools with new tools having built-in stud locators. Replacing tools can be prohibitively expensive for many users, and also can require retailers to stock additional variations of each tool.

Another solution has been to provide a stud locator that can be permanently mounted to a tool. For example, U.S. Pat. No. 7,066,278 to Shotey discusses a power tool having a location sensor that permanently mounts to a tool for locating studs behind a wall. One problem with the Shotey solution is that the sensor typically is permanently affixed to the tool, and thus lacks the ability to be used on a plurality of tools and be removed from the tool when desired (e.g., leaving a work site).

Thus, there is still a need for a locator device that can releasably attach to a tool, while having the ability to be used with a variety of tools, and removed when desired.

SUMMARY OF THE INVENTION

The inventive subject matter provides apparatus and methods in which a tool adapter is configured to locate a stud. The adapter has a mounting portion that releasably attaches to a tool, and a detector portion configured to detect the presence of the stud. This is advantageous as the mounting portion allows the adapter to be securely attached to a tool while also allowing for the quick removal of the adapter when desired. In preferred embodiments, a single adapter could be used with multiple tools. As used herein, the term "stud" is defined as any member of a building's framework suitable for mounting wallboard, drywall, and other building materials.

The adapter could be made of any commercially available material including for example, metals, woods, plastics, composites, fabrics, and any combinations thereof. Preferably, the adapter comprises a light-weight plastic or other material such that an adapter-to-tool weight ratio is at most 1:2, more preferably 1:8, and most preferably 1:16. It is also contemplated that the adapter has a durable construction to allow for ordinary use such as at a construction site. For example, preferred adapters are sufficiently durable to withstand the impact from a fall of at least six feet, more preferably at least eight feet, and most preferably at least twelve feet. Unless a contrary intent is apparent from the context, all ranges recited herein are inclusive of their endpoints, and open-ended ranges should be interpreted to include only commercially practical values.

The mounting and detector portions could be coupled together using any suitable commercially available fastener including for example, screws, nails, clamps, clips, hooks and loops, glues, adhesives, bondings, magnets, and any combinations thereof. It is also contemplated that the portions could be a single fabricated piece. Further, the mounting and detector portions could be contained within a housing, which is preferably sized and dimensioned to function with a specific tool.

The mounting portion is configured to releasably attach externally to a tool. In one embodiment, the tool could include internal features that mate with the mounting portion of the adapter. In preferred embodiments, the mounting portion has an opening sized and dimensioned to allow the mounting portion to attach to an end of at least one of a drill, nail gun, or screw gun. Preferably, the mounting portion has an opening with a length-adjustable diameter to allow the mounting portion to releasably attach to different tools including for example, screw guns, nail guns, and drills. This is advantageous as it allows the adapter to releasably attach to a variety of tools by adjusting the length of the diameter of the mounting portion. Any commercially suitable fastener could be used to adjust the length of the diameter including for example, screws, clips, buckles, and hooks and loops. Contemplated diameter ranges include a minimum of ⅛ inches to at least a maximum of 2 inches, and more preferably a maximum of 3 inches.

The detector portion could comprise any suitable commercially available technology that allows for the detection of a stud. The detector portion could further include an audio and/or visual output to apprise a user of the status of the device (e.g., operability, battery life, etc.) as well as inform a user when a stud has been located. This is advantageous as it allows a user to quickly ascertain the status of the adapter and determine when a stud has been located. The audio output could comprise any suitable output that provides an audible alert including for example, a speaker, alarm, bell, and any combination thereof. The audio output could include circuitry to allow it to sound when a stud is located or gradually increase in volume as the detector portion moves closer to a stud. The visual output could comprise any suitable output that provides a visual alert including for example, a light, a display, and any combination thereof. Preferably, at least two lights are used to inform the user of the status of the adapter as well as when a stud has been located. More preferably, the lights are of different wavelengths to allow the user to quickly determine the meaning of the visual output. The visual output could also include circuitry to allow the light to blink.

The detector portion could optionally have additional features and functionality. For example, the detector portion could be configured to measure atmospheric conditions, such as temperature or humidity. Also, the detector could have functionality to measure distances, such as between a first and second point along a wall. The detector could be configured to detect a stud at a point where the tool comes into contact with the wall. However, it is also contemplated that the detector portion could be configured to detect a stud at some point vertically above or below the point where the tool contacts a wall. Preferably, the detector portion detects a stud within 8 inches of the point where the tool comes into direct contact with the wall, more preferably 5 inches, and most preferably 2 inches. On other contemplated embodiments, the adapter could be sized and dimensioned to serve as a stand to hold the tool in an upright position.

In one aspect, the adapter could further comprise a mount that slidably holds the detector portion. Preferably, the mount could include at least one spring or mechanical device providing similar functionality that biases the detector portion to be at least partially outside of the mount. This is advantageous as the detector portion can thereby move within the mount to allow the nail, screw or other fastener to be inserted. The adapter could further comprise circuitry that allows the adapter to operate on a DC voltage.

In other aspects, a method of attaching a stud locating device to a tool is disclosed. A stud locating device is provided. A mounting piece is also provided having an opening larger than the diameter of the tool. A portion of the tool is fitted within the mounting piece's opening, and the opening is then tightened to prevent unintentional and undesired movement of the stud locating device. Preferably, tightening of the opening involves reducing the opening of the mounting piece to the diameter of the portion of the tool within the opening. While the tool is preferably a screw gun or drill, all tools are contemplated that could benefit from the addition of a removably attached stud locating device.

Various objects, features, aspects and advantages of the inventive subject matter will become more apparent from the following detailed description of preferred embodiments, along with the accompanying drawings in which like numerals represent like components.

DETAILED DESCRIPTION

Figure 1A:
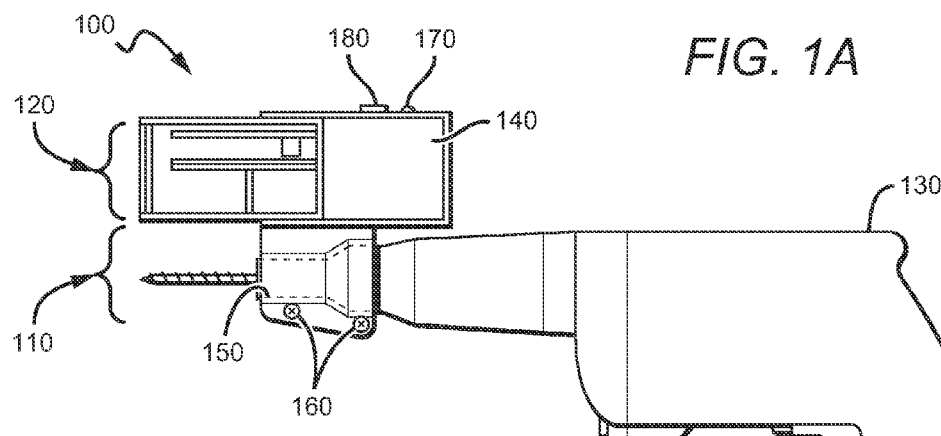
FIG. 1A is a perspective view of an adapter configured to locate a stud or beam that is attached to a tool.
Figure 1B:
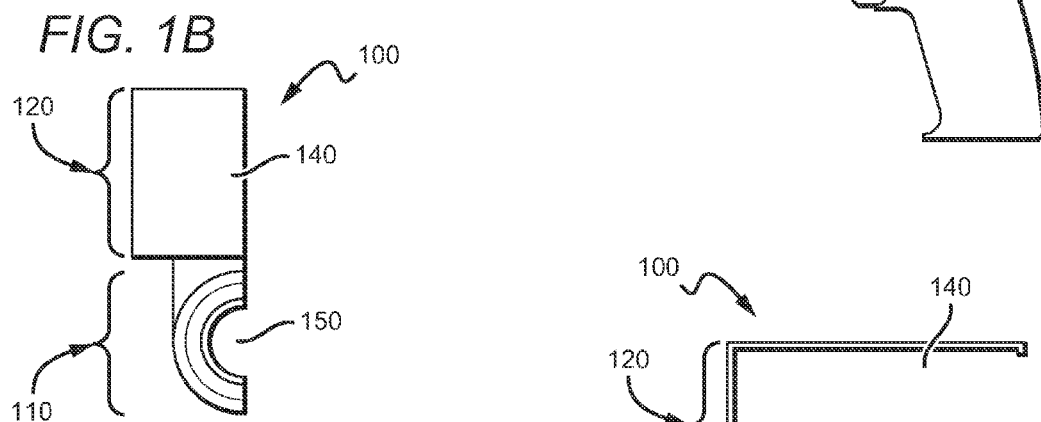
FIGS. 1B-1D are front, side, and rear cross-sectional views of the adapter of FIG. 1A, respectively.
Figure 1C:
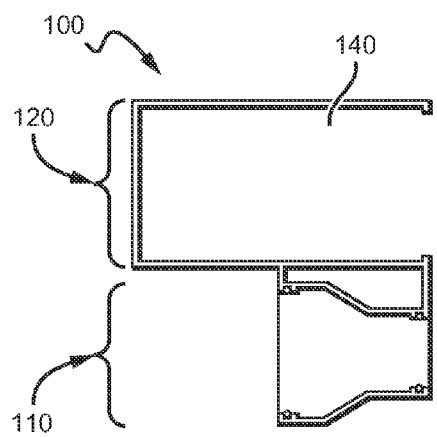
Figure 1D:
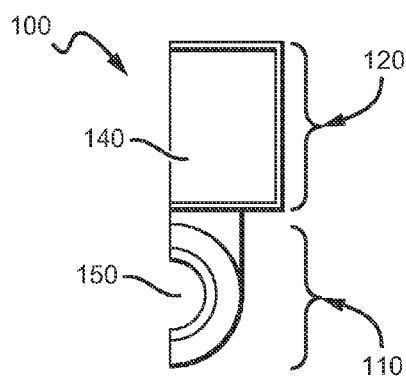

In FIGS. 1A-1D, an adapter 100 is provided having a mounting portion 110 coupled to a detector portion 120.

Mounting portion 110 is releasably attached externally to tool 130. While mounting portion 110 has an opening 150 sized and dimensioned to releasably attach to a screw gun, it is also contemplated that the opening could be sized and dimensioned to releasably attach to a drill, as well as other tools. Preferably, the opening 150 can have a length-adjustable diameter. For example, as shown in FIG. 1, the diameter can be adjusted in length through the use of at least one fastener 160 including for example, a screw. However, any commercially suitable fasteners could be used including for example, clips, snaps, buckles, hooks and loops, and any combination thereof. The range of adjustability of the diameter could be any commercially practical length, and preferably is a range of a minimum of ⅛ inches to at least a maximum of 2 inches, and more preferably a maximum of 3 inches. In other contemplated embodiments, mounting portion can be releasably attached to the tool by use of one or more fasteners including for example, hooks and loops, clips, snaps, magnets, and any combination thereof.

Detector portion 120 can be any commercially available device configured to detect the presence of a stud or beam. Preferably, detector portion 120 has at least one light 170 configured to provide a visual alert. The visual alert could include for example, the light switching on/off, dimming/brightening, blinking, and any combination thereof. In preferred embodiments, at least two lights, and more preferably at least three are used to indicate both the status of the device and when a stud has been located. When two or more lights are used, it could be desirable to provide lights of different wavelengths to allow a user to quickly understand the meaning of the illuminated light.

Detector portion 120 further includes speaker 180 configured to provide an audible alert. While a speaker is shown, it is also contemplated that other audio outputs could be used including for example, an alarm, a bell, a buzzer, and any combination thereof. The audible alert could include for example, sounding a noise when a stud or beam is located, and gradually increasing/decreasing a noise the detector portion moves toward/away from a stud, respectively.

Adapter 100 further comprises a mount 140 that slidably holds the detector portion 120. Mount could also include a fastener (not shown) that can be used to securely retain the detector portion within the mount, such as when the detector portion is not in use. It is also contemplated a track could be substituted for the mount to allow detector portion to move along the track relative to the mounting portion.

Figure 2:
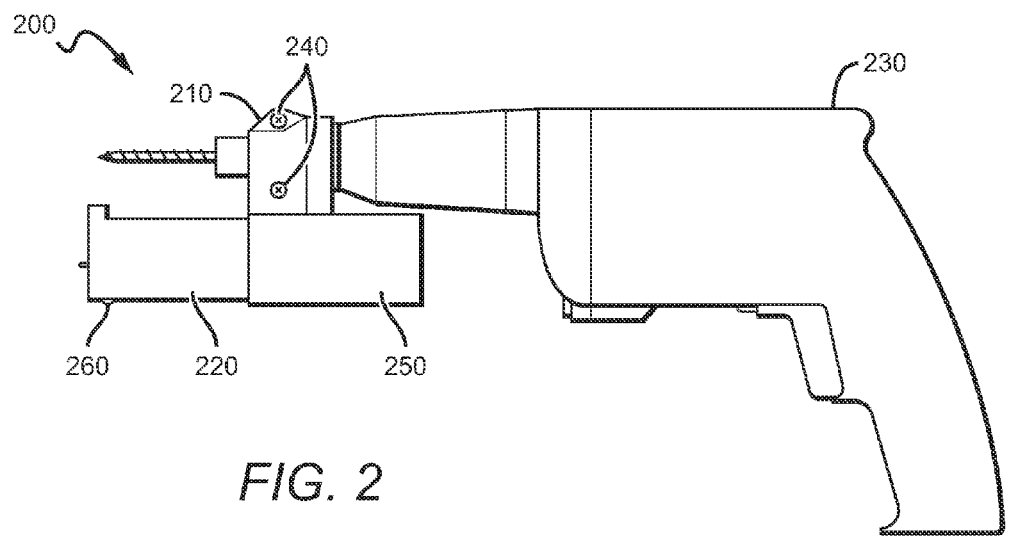
FIGS. 2-3 are perspective views of alternative embodiments of the adapter of FIG. 1.

In FIG. 2 adapter 200 is shown having a mounting portion 210 and detector portion 220, similar to the portions in FIGS. 1A-1D. Mounting portion 210 has an opening (not shown) sized and configured to releasably attach to tool 230. The opening has a diameter that is adjustable in length by the use of fasteners 240. Any commercially suitable fastener could be used including for example, those discussed above. Detector portion 220 has at least one light 260. Adapter 200 further comprises a mount 250 that slidably holds detector portion 220.

Figure 3:
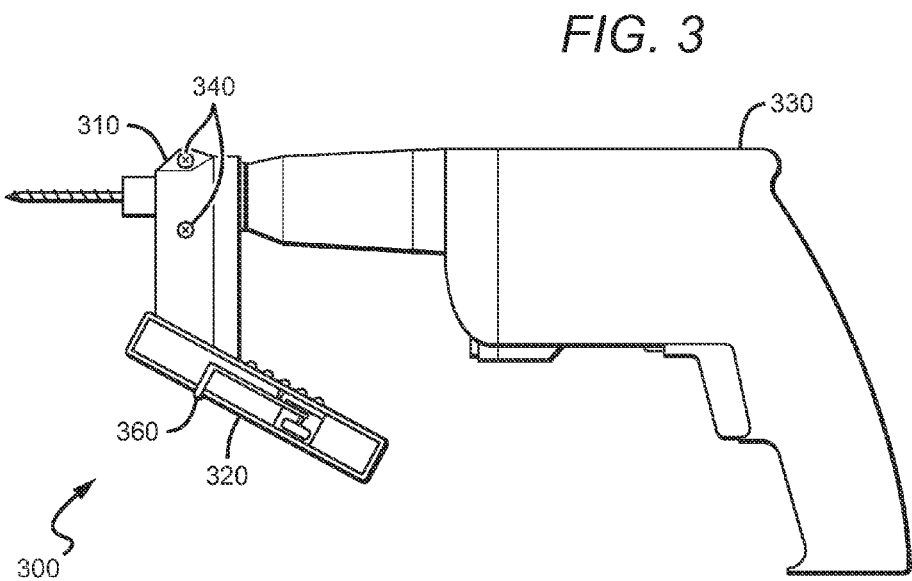

In FIG. 3, adapter 300 is shown having mounting portion 310 and detector portion 320. Mounting portion 310 has an opening (not shown) sized and configured to releasably attach to tool 330. The opening has a diameter that is adjustable in length by the use of fasteners 340. Again, any commercially suitable fastener could be used including for example, those discussed above. Detector portion 320 further comprises light 360.

Figure 4:
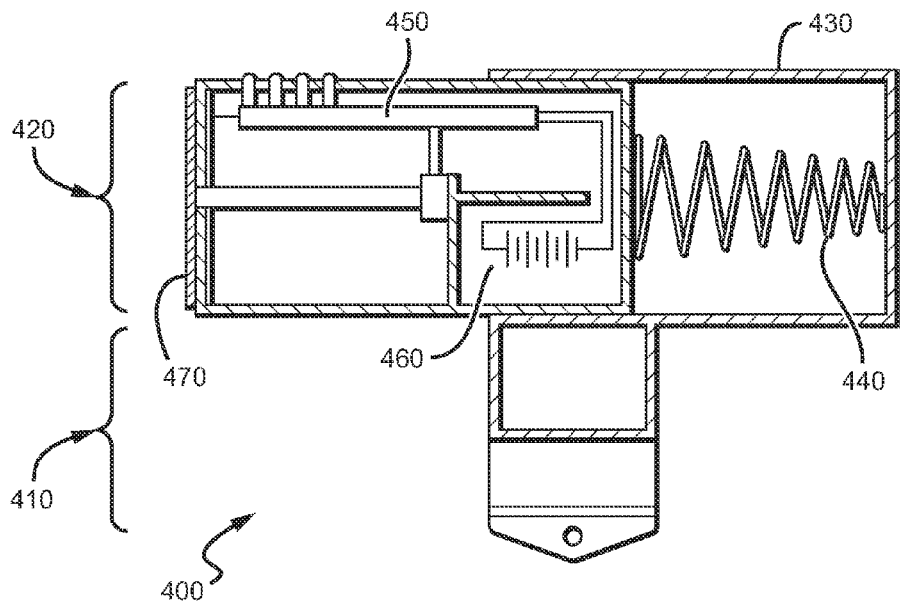
FIG. 4 is a cross-sectional view of an adapter configured to locate a stud or beam that is attached to a tool.

FIG. 4 illustrates a cross-sectional view of an adapter 400 having a mounting portion 410 and a detector portion 420. Detector portion 420 could be at least partially housed within mount 430. Preferably, mount 430 includes spring 440 that biases detector portion 420 in a position at least partially outside of mount 430. This is advantageous, as an end of the detector portion could be located at an approximately equal distance from a tip of the fastener to be inserted. In other contemplated embodiments, the mount could include for example, two or more springs, and any commercially suitable alternative that is functionally similar to a spring including for example, the use of a magnetic force.

Detector portion 420 includes circuitry 450 configured to operate the detector portion. Preferably, circuitry 450 is further configured to allow detector portion to operate on a DC voltage such as that of battery 460. Detector portion 420 could optionally include pad 470 attached to an end of detector portion, which advantageously helps to protect surfaces such as a painted wall from scratches and scuffs caused by detector portion.

Figure 5:
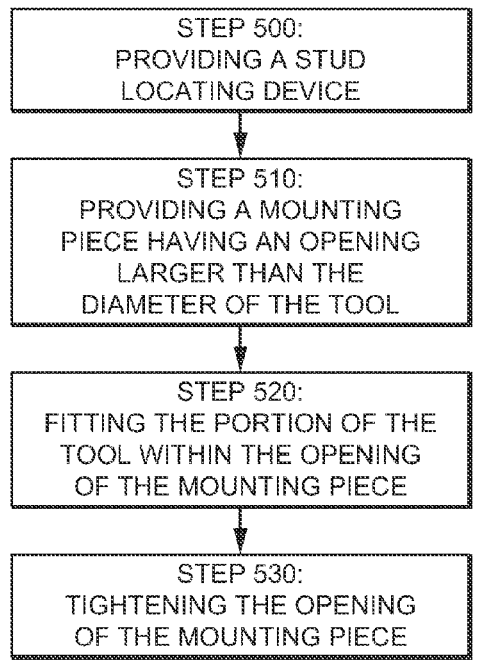
FIG. 5 is a flowchart of a method for attaching a stud locating device to a tool.

In FIG. 5, a method of attaching a stud locating device to a tool is shown. The tool has at least one portion with a diameter. Any commercially available tool that could benefit from the addition of a stud finder is contemplated including for example, a screw gun and a drill. Initially, a stud locating device is provided (step 500). A mounting piece is provided having an opening larger than the diameter of the tool (step 510). The portion of the tool is fitted within the opening of the mounting piece (step 520). The opening of the mounting piece is tightened (step 530), which secures the adapter to the tool. In one aspect, tightening of the mounting piece's opening can be accomplished by reducing the mounting piece's opening to the diameter of the tool.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An adapter configured to locate a stud comprising;
    a mounting portion configured to releasably attach externally to a tool, and that includes a housing sized and dimensioned to enclose the detector portion when not in use; and
    a detector portion configured to detect the presence of a stud in or behind a surface, wherein the detector portion is slidably coupled to the mounting portion, such that the detector portion moves within the housing as a fastener is inserted into the surface by the tool.

2. The adapter of claim 1, wherein the mounting portion has an opening sized and dimensioned to releasably attach to a chuck of a drill.

3. The adapter of claim 1, wherein the mounting portion has an opening sized and dimensioned to releasably attach to a screw gun.

4. The adapter of claim 1, wherein the detector portion has a speaker that produces an audible alert when the stud is located.

5. The adapter of claim 1, wherein the detector portion has at least one light configured to provide a visual alert when the stud is located.

6. The adapter of claim 1, wherein the mounting portion comprises an opening having a length-adjustable diameter.

7. The adapter of claim 1, wherein the detector portion has a circuitry that operates on a DC voltage.

8. The adapter of claim 1, wherein the detector portion is configured to be slideably received into and out from the housing.

9. The adapter of claim 1, further comprising a fastener coupled to the housing such that the detector portion is securely retained within the housing when not in use.

* * * * *